United States Patent
Hibira et al.

(10) Patent No.: US 9,657,661 B2
(45) Date of Patent: May 23, 2017

(54) ENGINE CONTROL SYSTEM

(71) Applicant: KEIHIN CORPORATION, Shinjuku-ku, Tokyo (JP)

(72) Inventors: Takashi Hibira, Shioya-gun (JP); Shinji Yokoyama, Shioya-gun (JP); Masaya Ootsuka, Shioya-gun (JP); Makoto Haruta, Shioya-gun (JP); Noriaki Sumisya, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 77 days.

(21) Appl. No.: 14/689,427

(22) Filed: Apr. 17, 2015

(65) Prior Publication Data
US 2015/0308361 A1    Oct. 29, 2015

(30) Foreign Application Priority Data
Apr. 23, 2014  (JP) ................. 2014-089475

(51) Int. Cl.
*F02D 41/00* (2006.01)
*F02D 41/14* (2006.01)
(Continued)

(52) U.S. Cl.
CPC ....... *F02D 41/0027* (2013.01); *F02D 19/061* (2013.01); *F02D 19/0615* (2013.01); *F02D 19/0621* (2013.01); *F02D 19/0628* (2013.01); *F02D 19/0647* (2013.01); *F02D 41/0025* (2013.01); *F02D 41/0032* (2013.01);
(Continued)

(58) Field of Classification Search
CPC ......... Y02T 10/44; Y02T 10/36; Y02T 10/22; F02D 41/1456; F02D 41/1441; F02D 41/1454; F02D 41/1495; F02D 41/2454; F02D 41/0025; F02D 41/1475; F02D 2041/1423; F02D 2200/0612;
(Continued)

(56) References Cited

U.S. PATENT DOCUMENTS 5,237,979 A * 8/1993 Hyodo ................ F02D 41/0045
                                                      123/516
5,485,824 A * 1/1996 Kondou ................ F02M 25/08
                                                      123/520
(Continued)

FOREIGN PATENT DOCUMENTS

JP        2011220253 A      11/2011

*Primary Examiner* — Long T Tran
(74) *Attorney, Agent, or Firm* — Cantor Colburn LLP

(57) ABSTRACT

An engine control system is a system configured to selectively switch between first fuel and second fuel and perform an operation control of a single engine, including: a sensor configured to detect an oxygen concentration of an exhaust gas that is exhausted from the engine; and a control device configured to perform an air-fuel ratio feedback control such that an air-fuel ratio becomes a target air-fuel ratio based on an output signal of the sensor, wherein the control device calculates a correction coefficient of an air-fuel ratio feedback control during an operation with the second fuel, and further stores a fuel composition correction coefficient that is a value in a predetermined range and corrects a difference between the calculated correction coefficient and a targeted correction coefficient arising from a change in composition of the second fuel.

8 Claims, 3 Drawing Sheets

(51) Int. Cl.
*F02D 41/24* (2006.01)
*F02D 19/06* (2006.01)
*F02D 41/12* (2006.01)

(52) U.S. Cl.
CPC ..... *F02D 41/1439* (2013.01); *F02D 41/1454* (2013.01); *F02D 41/2454* (2013.01); *F02D 41/126* (2013.01); *F02D 41/1488* (2013.01); *F02D 2200/0612* (2013.01); *Y02T 10/36* (2013.01)

(58) Field of Classification Search
CPC ..... F02D 2041/1433; F02D 2200/0814; F02D 19/0613
USPC ......................................................... 123/674
See application file for complete search history.

(56) References Cited

U.S. PATENT DOCUMENTS

| | | | | |
|---|---|---|---|---|
| 5,623,913 A * | 4/1997 | Kitajima | ............... | F02D 41/008 123/673 |
| 6,283,106 B1 * | 9/2001 | Kadowaki | ............... | F02D 41/22 123/674 |
| 6,520,168 B2 * | 2/2003 | Ishii | .................... | F02D 41/1441 123/695 |
| 7,162,359 B2 * | 1/2007 | Yasui | .................. | F02D 41/1401 60/276 |
| 7,856,307 B2 * | 12/2010 | Ito | ........................... | F02D 19/12 123/674 |
| 7,908,073 B2 * | 3/2011 | Takubo | ............... | F02D 41/0032 123/703 |
| 8,381,707 B2 * | 2/2013 | Mizoguchi | ........... | F01N 11/007 123/696 |
| 8,393,312 B2 * | 3/2013 | Lewis | ................. | F02D 41/0025 123/299 |
| 2010/0101548 A1 * | 4/2010 | Ito | ........................... | F02D 19/12 123/674 |
| 2010/0217506 A1 * | 8/2010 | Mizoguchi | ........... | F01N 11/007 701/109 |
| 2012/0006307 A1 * | 1/2012 | Demura | ............. | F02D 41/1454 123/674 |
| 2013/0340410 A1 * | 12/2013 | Suzuki | ................ | F02D 41/0032 60/285 |

\* cited by examiner

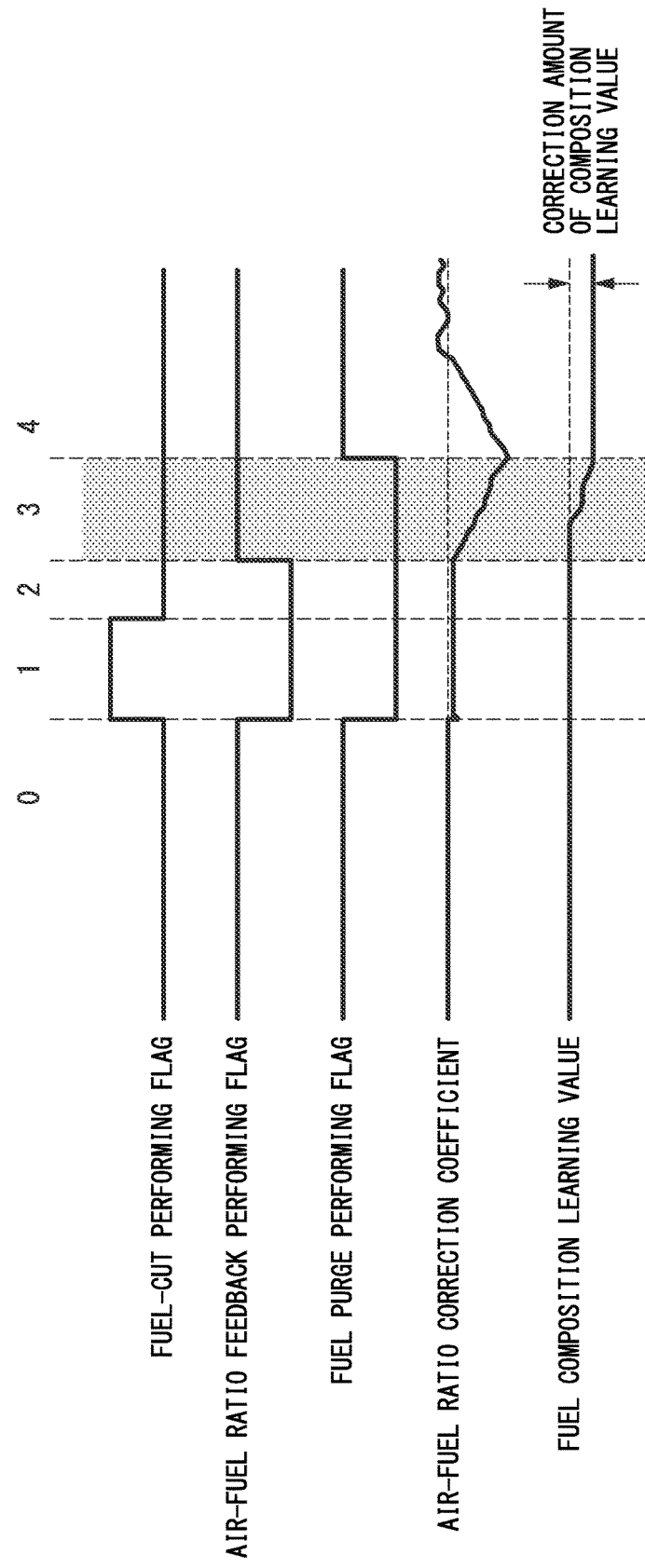

ENGINE CONTROL SYSTEM

CROSS-REFERENCE TO RELATED APPLICATION

The present invention claims priority under 35 U.S.C. §119 to Japanese Application No. 2014-089475 filed Apr. 23, 2014, the entire content of which is incorporated herein by reference.

BACKGROUND

Field of the Invention

The present invention relates to an engine control system.

Background

In recent years, as a technique of improving fuel consumption performance and environmental protection performance of a vehicle, the introduction of a Bi-Fuel Engine system, which selectively switches between liquid fuel such as gasoline and gas fuel such as compressed natural gas (CNG) and performs operation control of a single engine, has advanced. In general, in the operation control of an engine, an air-fuel ratio feedback control of controlling a fuel injection amount such that an actual air-fuel ratio becomes a target air-fuel ratio (theoretical air-fuel ratio) is performed. However, in the case of a Bi-Fuel Engine system, it is necessary to perform an air-fuel ratio feedback control during both the liquid fuel operation (gasoline operation) and the gas fuel operation (gas operation).

For example, Japanese Patent Application, Publication No. 2011-220253A discloses a technique of individually learning (acquiring) a correction coefficient used for the air-fuel ratio feedback control with respect to the duration of both the liquid fuel operation and the gas fuel operation in the Bi-Fuel Engine system and controlling a fuel injection amount by use of the correction coefficient stored individually when switching between the liquid fuel operation and the gas fuel operation.

Further, Japanese Patent Application, Publication No. 2011-220253A also discloses a control in which in order to remove the impact of evaporated fuel, called vapor, resulting from the evaporation of liquid fuel, purging the vapor to the engine is inhibited while the correction coefficient is being learned.

SUMMARY

The gas composition of gas fuel may differ depending on the area. In such a case, since there is a possibility that a correction coefficient learned based on gas fuel supplied in one area may not be a value suitable for use in an operation with gas fuel supplied in another area, it is necessary to learn the correction coefficient again such that the correction coefficient becomes a value suitable for gas fuel that is in use.

In view of the foregoing, an object of an aspect of the present invention is to provide an engine control system capable of appropriately controlling a fuel injection amount even when the composition of gas fuel changes.

(1) An aspect of the present invention is an engine control system configured to selectively switch between a first fuel and a second fuel and perform an operation control of a single engine, the engine control system including: a sensor configured to detect an oxygen concentration of an exhaust gas that is exhausted from the engine; and a control device configured to perform an air-fuel ratio feedback control such that an air-fuel ratio becomes a target air-fuel ratio based on an output signal of the sensor, wherein the control device includes: a correction device configured to calculate a correction coefficient of an air-fuel ratio feedback control during an operation with the second fuel and further correct a difference between the calculated correction coefficient and a targeted correction coefficient arising from a change in composition of the second fuel; a storage device configured to store a fuel composition correction coefficient that is a value in a predetermined range; and a limiting device configured to set a limit to a changing range when the fuel composition correction coefficient is stored.

(2) In the aspect of the above (1), the control device may calculate the fuel composition correction coefficient when the air-fuel ratio feedback control is in operation and while a purge control is stopped.

(3) In the aspect of the above (1) or (2), an allowable value of the fuel composition correction coefficient may be set in a range such that the change of the composition of the second fuel can be corrected while a predetermined operation state is continued for a predetermined duration.

(4) In the aspect of any one of the above (1) to (3), the control device may not store the fuel composition correction coefficient in a state where the load of the engine or the rotation number of the engine is high.

According to the aspect of the present invention, it is possible to appropriately control a fuel injection amount even when the composition of gas fuel changes.

BRIEF DESCRIPTION OF THE DRAWINGS

FIG. 3 is a timing chart showing an example of a timing of learning a difference in fuel composition.

DESCRIPTION OF THE EMBODIMENTS

Hereinafter, an embodiment of the present invention will be described with reference to the drawings. In the following, as an engine control system according to the embodiment of the present invention, an example of a Bi-Fuel Engine system configured to selectively switch between liquid fuel (first fuel) such as gasoline and gas fuel (second fuel) such as compressed natural gas (CNG) and perform an operation control of a single engine is described.

Figure 1:
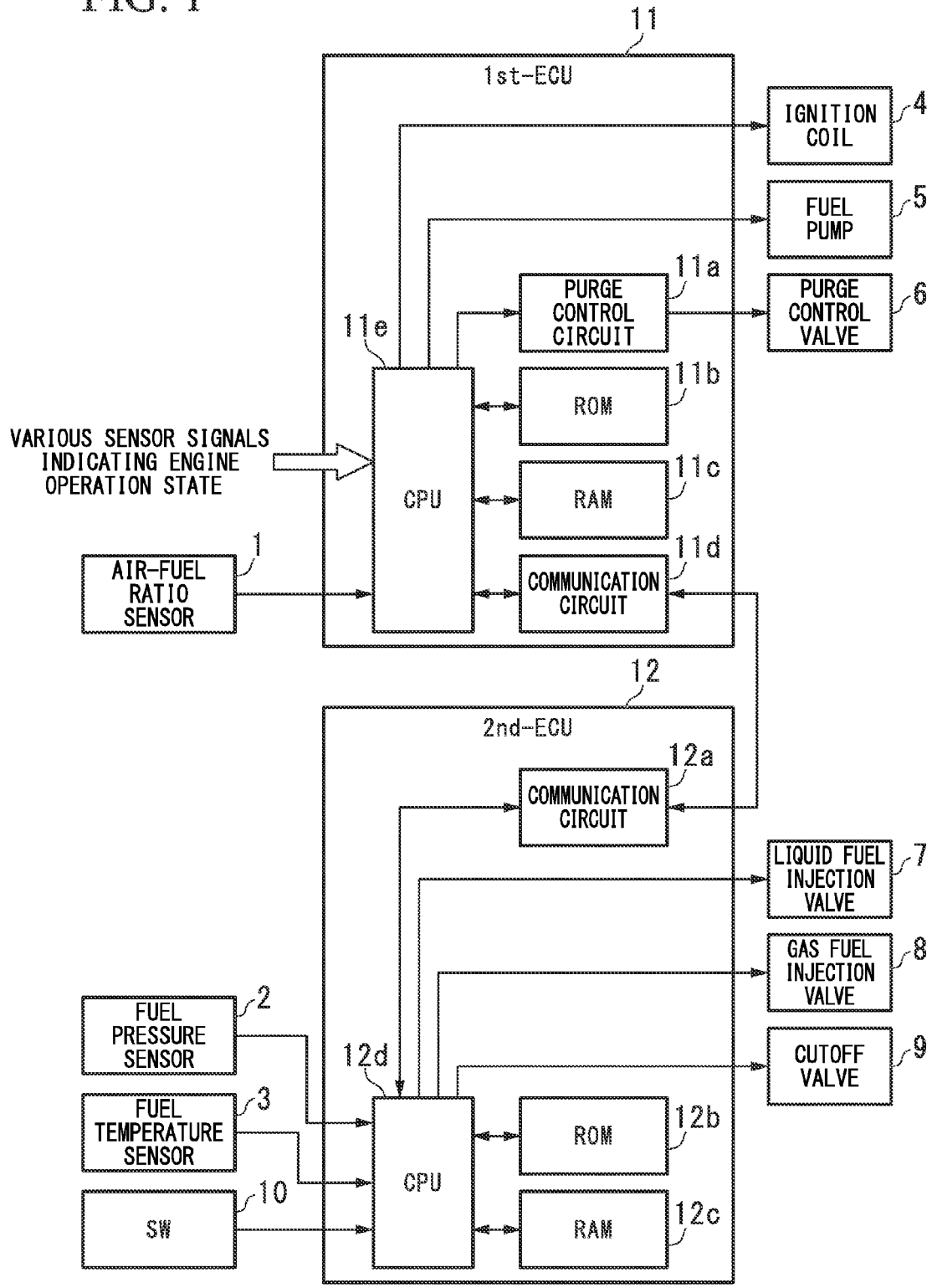
FIG. 1 is a schematic configuration diagram of an engine control system in the present embodiment.

FIG. 1 is a schematic configuration diagram of an engine control system in the present embodiment. As shown in FIG. 1, the engine control system in the present embodiment includes an air-fuel ratio sensor 1, a fuel pressure sensor 2, a fuel temperature sensor 3, an ignition coil 4, a fuel pump 5, a purge control valve 6, a liquid fuel injection valve 7, a gas fuel injection valve 8, a cutoff valve 9, a fuel changing switch 10, a 1st-ECU (Electronic Control Unit) 11, and a 2nd-ECU 12.

Note that, the 1st-ECU 11 and the 2nd-ECU 12 are components that correspond to a control device.

A variety of sensor signals that indicate an engine operation state are input to the 1st-ECU 11. Specifically, sensor signals output from a crank angle sensor, an intake pressure sensor, an intake air temperature sensor, a throttle aperture sensor, a coolant temperature sensor, and the like are input to the 1st-ECU 11.

The air-fuel ratio sensor 1 is, for example, an oxygen sensor that uses zirconia as a gas detection material, is provided on an exhaust pipe of the engine such that a gas contact part is exposed to an exhaust flow channel, and outputs a voltage signal depending on an oxygen concentration of exhaust gas to the 1st-ECU 11. The fuel pressure sensor 2 detects the pressure of gas fuel on the downstream side of a regulator in a gas fuel supply path from a gas fuel tank to the gas fuel injection valve 8 and outputs a fuel pressure signal that indicates the detection result to the 2nd-ECU 12. The fuel temperature sensor 3 detects the temperature of gas fuel on the downstream side of the regulator described above and outputs a fuel temperature signal that indicates the detection result to the 2nd-ECU 12.

The ignition coil 4 is a transformer configured by a primary winding and a secondary winding. The ignition coil 4 boosts an ignition voltage signal supplied to the primary winding from the 1st-ECU 11 and supplies the boosted ignition voltage signal to an ignition plug of the engine from the secondary winding. The fuel pump 5 pumps liquid fuel in a liquid fuel tank and pressurizes and feeds the pumped liquid fuel to a fuel inlet of the liquid fuel injection valve 7 in response to a pump drive signal supplied from the 1st-ECU 11. The purge control valve 6 is provided in order to purge evaporated fuel (vapor) made by the evaporation of liquid fuel to the engine based on a purge control signal supplied from the 1st-ECU 11.

The liquid fuel injection valve 7 is an electromagnetic valve that is provided on an intake pipe such that an injection port is exposed to an intake flow channel. The liquid fuel injection valve 7 injects, through the injection port, liquid fuel (gasoline or the like) supplied from the liquid fuel tank in response to a fuel injection valve drive signal supplied from the 2nd-ECU 12. Note that, the fuel injection valve drive signal supplied to the liquid fuel injection valve 7 is a signal generated by the 1st-ECU 11 and output to the 2nd-ECU 12.

The gas fuel injection valve 8 is an electromagnetic valve that is provided on the intake flow channel. The gas fuel injection valve 8 injects, through the injection port, gas fuel (CNG or the like) supplied from the gas fuel tank in response to a fuel injection valve drive signal supplied from the 2nd-ECU 12. The cutoff valve 9 is an electromagnetic valve interposed in the gas fuel supply path from the gas fuel tank to the regulator. The cutoff valve 9 has a role of performing a valve open operation and a valve close operation in response to a cutoff valve drive signal supplied from the 2nd-ECU 12 and thereby switching between a supply start of the gas fuel from the gas fuel tank to the gas fuel injection valve 8 and a supply stop.

The fuel changing switch 10 is a switch that makes it possible to switch between fuels by a manual operation. The fuel changing switch 10 outputs, to the 2nd-ECU 12, a fuel selection signal that indicates the state of the switch, that is, whether the liquid fuel is selected or the gas fuel is selected as the fuel used by the engine.

The 1st-ECU 11 performs an engine operation control by the liquid fuel. The 1st-ECU 11 includes a purge control circuit 11a, an electrically rewritable ROM (Read Only Memory) 11b, a RAM (Random Access Memory) 11c, a communication circuit 11d, and a CPU (Central Processing Unit) 11e. The purge control circuit 11a generates a purge control signal used to drive the purge control valve 6 based on a control signal output from the CPU 11e.

The ROM 11b is a non-volatile memory that preliminarily stores an engine control program and a variety of setting data used to implement a variety of functions of the CPU 11e. The RAM 11c is a volatile working memory used as the destination to temporarily save data when the CPU 11e executes the engine control program and performs a variety of operations. The communication circuit 11d is a communication interface that realizes a digital communication (for example, CAN communication) between the 1st-ECU 11 and the 2nd-ECU 12 under the control by the CPU 11e. The communication circuit 11d is connected to the 2nd-ECU 12 via a communication cable.

The CPU 11e performs the engine operation control by the liquid fuel based on a crank pulse signal (signal output per rotation of a crank shaft of the engine at a constant angle), an engine rotation number, an intake pressure value, an intake air temperature value, a throttle aperture value, a coolant temperature value, an air-fuel ratio sensor output voltage value, and a variety of information obtained from the 2nd-ECU 12 via the communication circuit 11d, in accordance with the engine control program stored in the ROM 11b.

Further, when the CPU 11e determines that the currently selected fuel is the liquid fuel based on a fuel change signal received from the 2nd-ECU 12 via the communication circuit 11d, the CPU 11e controls the fuel pump 5 and performs injection of the liquid fuel by the liquid fuel injection valve 7 at a time point when a piston arrives at a position that corresponds to a fuel injection timing. Here, the CPU 11e calculates and controls an energizing time of the liquid fuel injection valve 7 (that is, a pulse width of the fuel injection valve drive signal supplied to the liquid fuel injection valve 7 via the 2nd-ECU 12), and thereby controls the injection amount of the liquid fuel.

Further, when the engine is in a predetermined operation state, the CPU 11e controls the fuel injection amount such that the actual air-fuel ratio becomes the target air-fuel ratio (theoretical air-fuel ratio) based on an air-fuel ratio sensor output voltage value (air-fuel ratio feedback control). Specifically, the CPU 11e calculates an air-fuel ratio correction coefficient capable of reducing the fuel injection amount when the actual air-fuel ratio is "rich" relative to the target air-fuel ratio and increasing the fuel injection amount when the actual air-fuel ratio is "lean" relative to the target air-fuel ratio, and controls the fuel injection amount by using the air-fuel ratio correction coefficient.

Further, the CPU 11e calculates the air-fuel ratio correction coefficient used to correct the energizing time based on the air-fuel ratio sensor output voltage value and also includes a so-called learning function that stores the calculated air-fuel ratio correction coefficient as a learned value in the ROM 11b along with information (for example, an engine rotation number and a throttle aperture value) indicating the engine operation state at the time of calculation of the air-fuel ratio correction coefficient such that the air-fuel ratio correction coefficient is not erased even if electric power is turned off.

Note that, the CPU 11e also has a function of transmitting the calculated energizing time and air-fuel ratio correction coefficient to the 2nd-ECU 12 via the communication circuit 11d while the engine is operating on gas fuel.

On the other hand, the 2nd-ECU 12 performs an engine operation control by the gas fuel and includes a communication circuit 12a, a ROM 12b, a RAM 12c, and a CPU 12d.

The communication circuit 12a is a communication interface that realizes a digital communication (for example, CAN communication) between the 1st-ECU 11 and the 2nd-ECU 12 under the control by the CPU 12d. The communication circuit 12a is connected to the 1st-ECU 11 (specifically, the communication circuit 11d) via a communication cable.

The ROM 12*b* is an electrically rewritable non-volatile memory that preliminarily stores the engine control program and a variety of setting data used to implement a variety of functions of the CPU 12*d*. The RAM 12*c* is a volatile working memory used as the destination to temporarily save data when the CPU 12*d* executes the engine control program and performs a variety of operations.

The CPU 12*d* performs the engine operation control by the gas fuel based on a fuel selection signal input from the fuel changing switch 10, an engine rotation number, a fuel pressure value obtained from the fuel pressure sensor 2, a fuel temperature value obtained from the fuel temperature sensor 3, and a variety of information obtained from the 1st-ECU 11 via the communication circuit 12*a*, in accordance with the engine control program stored in the ROM 12*b*.

Specifically, when the CPU 12*d* determines that the currently selected fuel is the gas fuel based on a fuel designation signal input from the fuel changing switch 10, the CPU 12*d* transmits a fuel change signal that indicates the determination result to the 1st-ECU 11 via the communication circuit 12*a*, opens the cutoff valve 9, and performs injection of the gas fuel by the gas fuel injection valve 8 at a time point when the piston arrives at a position that corresponds to a fuel injection timing.

Here, the CPU 12*d* receives the energizing time and the air-fuel ratio correction coefficient from the 1st-ECU 11 via the communication circuit 12*a* and acquires a current air-fuel ratio correction coefficient. The CPU 12*d* uses the air-fuel ratio correction coefficient and calculates a fuel composition learning value. The CPU 12*d* uses a fuel pressure correction coefficient calculated from the fuel pressure value and a fuel temperature correction coefficient calculated from the fuel temperature value, corrects the energizing time, and thereby calculates a final energizing time. The CPU 12*d* controls the injection amount of the gas fuel by the gas fuel injection valve 8 such that a fuel injection valve drive signal having a pulse width that corresponds to the final energizing time is supplied to the gas fuel injection valve 8.

The fuel composition learning value is a coefficient used to correct displacement of the fuel injection amount due to the dispersion of a composition or the density of the fuel gas that constitutes the gas fuel. For example, when the density of gas fuel supplied on one occasion is higher compared to that of gas fuel which has been used so far, the air-fuel ratio correction coefficient from the actual air-fuel ratio to the theoretical air-fuel ratio in the newly supplied gas fuel becomes small. The fuel composition learning value is a coefficient used to correct such a difference of the air-fuel ratio correction coefficient from the theoretical air-fuel ratio due to the composition or the density of the gas fuel.

The CPU 12*d* calculates a fuel composition learning value that makes the air-fuel ratio correction coefficient be "1".

Further, the CPU 12*d* includes a so-called learning function that stores the calculated fuel composition learning value as a learned value in the ROM 12*b* such that the calculated fuel composition learning value is not erased even if electric power is turned off. That is, the CPU 12*d* performs injection of the gas fuel based on the final energizing time calculated using the fuel composition learning value or the like, and with respect to the resulting exhaust gas, the CPU 12*d* stores, in the ROM 12*b*, a fuel composition learning value that makes the air-fuel ratio correction coefficient calculated by the CPU 11*e* based on the detection value of the air-fuel ratio sensor 1 be "1". Since the air-fuel ratio correction coefficient should be "1" as a result of an air-fuel ratio feedback control in a stable operation state, the control of the air-fuel ratio correction coefficient to be "1" means maintaining the stable operation state even in a case of operation by gas fuel.

Note that, as described later, the allowable value of the fuel composition learning value calculated by the CPU 12*d* is limited in a constant range. Further, the CPU 12*d* calculates the fuel composition learning value at the timing when the impact of vapor can be avoided.

Figure 2:
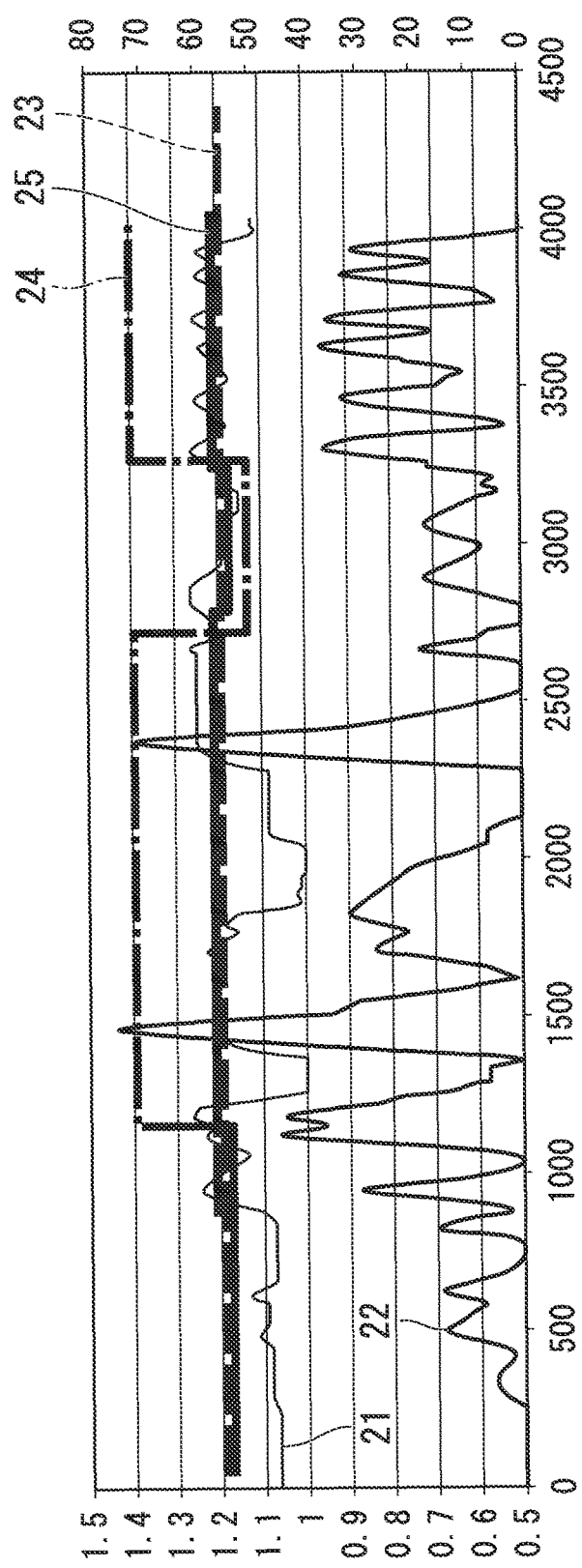
FIG. 2 is a diagram showing an advantage due to a fuel composition learning value being limited within a constant range.

FIG. 2 is a diagram showing an advantage due to the fuel composition learning value being limited within a constant range. In FIG. 2, the reference numeral 21 indicates the fuel composition learning value calculated by the CPU 12*d*.

The reference numeral 22 indicates a vehicle speed. The reference numeral 23 indicates a correction target value of the fuel injection amount with respect to the change of the composition of the gas fuel. In the case of FIG. 2, it is assumed that the fuel ratio in gas fuel is smaller than that of the reference gas fuel (dilute fuel gas) and therefore the targeted fuel injection amount becomes "1.2". Here, even in a case where a gap (difference) between the actual air-fuel ratio and the target air-fuel ratio occurs transiently like a case when the vehicle speed suddenly changes, if a correction amount used to correct the gap is learned to be a fuel composition learning value, the fuel composition learning value becomes inadequate in a steady state after the transient state. The reference numeral 24 indicates the behavior of the fuel injection amount when making, in the above manner, the fuel composition learning value follow the transient gap of the air-fuel ratio without any limit. When making, in the above manner, the fuel composition learning value follow the transient gap of the air-fuel ratio without any limit, the fuel injection amount deviates from the target value (reference numeral 23).

Therefore, when the gap between the actual air-fuel ratio and the target air-fuel ratio is large and the fuel composition learning value used to make the air-fuel ratio correction coefficient be "1" exceeds a certain range, the CPU 12*d* sets a predetermined upper limit of the fuel composition learning value to the fuel composition learning value and writes the set fuel composition learning value on the ROM 12*b*. The reference numeral 21 indicates the fuel composition learning value calculated by setting a limit in this way. The reference numeral 25 indicates the behavior of the fuel composition learning value in a case of setting a limit to the correction by the fuel composition learning value indicated by the reference numeral 21. In this case, it is indicated that the fuel composition learning value can converge to the target value.

FIG. 3 is a timing chart showing an example of a timing when the CPU 12*d* learns the gap of fuel composition.

In FIG. 3, a fuel-cut performing flag indicates the timing when fuel-cut occurs. Specifically, fuel-cut occurs in the duration indicated by "1". An air-fuel ratio feedback performing flag indicates the timing when the air-fuel ratio feedback control is being performed by the 1st-ECU 11. Specifically, the CPU 11*e* performs the air-fuel ratio feedback control in the durations indicated by "0", "3", and "4". A fuel purge performing flag indicates a duration in which a control valve for the purging of vapor is in operation. Specifically, in the durations indicated by "0" and "4", the CPU 11*e* performs a control (hereinafter, referred to as a purge control) that supplies vapor to the engine.

As described above, the fuel composition learning value is calculated based on the air-fuel ratio correction coefficient. In order to use the air-fuel ratio correction coefficient, the air-fuel ratio feedback control needs to be performed. Further, it is necessary to avoid the impact of vapor when the fuel composition learning value is calculated, in order to calculate the fuel composition learning value with respect to the change of the composition of the gas fuel (second fuel). Therefore, the CPU 12*d* calculates the fuel composition learning value by using the timing when the air-fuel ratio feedback control is performed and the vapor is not supplied to the engine. In the engine control system of the present embodiment, the air-fuel ratio feedback control and the purge control are stopped immediately after fuel-cut. Further, after returning from the fuel-cut state, first, the air-fuel ratio feedback control operates, and then the purge control operates. Thus, the CPU 12*d* calculates the fuel composition learning value by use of a time when a condition is satisfied, that is, a time after the start of the air-fuel ratio feedback control and before the purge control, indicated by "3". That is, the CPU 12*d* calculates the fuel composition learning value that makes the air-fuel ratio correction coefficient be "1" at a predetermined interval in the duration in which a learning condition indicated by "3" is satisfied and writes the calculated fuel composition learning value on the ROM 12*b*.

By calculating and storing the fuel composition learning value in this way, in a case of performing an operation by the gas fuel after the fuel-cut occurs, or in a case of switching fuel from liquid fuel to gas fuel, it is possible to make the stored value as the initial value of the fuel composition learning value, and it is possible to calculate a value closer to the actually required fuel injection amount. For example, when dense gas fuel is used, by storing in advance a fuel composition learning value that reduces the fuel injection amount, it is possible to maintain a state where the air-fuel ratio correction coefficient=1 when switching from liquid fuel to gas fuel. Further, since a time when the purge is stopped is found and the fuel composition learning is performed, it is possible to correct the fuel injection amount depending on the gap of the composition of the gas fuel without amending the purge control.

Note that, the timing when the fuel composition learning value is calculated is not limited to the above embodiment. If the purge is stopped at a different timing, the calculation of the fuel composition learning value may be performed at the timing. Further, the CPU 11*e* can determine the timing in which the fuel-cut occurred or the timing when returning from the fuel-cut state based on, for example, a detection signal of the throttle aperture sensor. Further, the CPU 11*e* has a function of performing purge when a predetermined condition is satisfied in operations with any of the liquid fuel and the gas fuel, and the CPU 11*e* can understand the start timing of the purge control. Accordingly, by receiving a signal from the CPU 11*e* at each of a return timing from the fuel-cut state, a start timing of the air-fuel ratio feedback control, and a start timing of the purge control, the CPU 12*d* can understand a timing of performing calculation of the fuel composition learning value.

Further, the range in which the fuel composition learning value is limited may be set to a range that is capable of correcting the gap of the air-fuel ratio correction coefficient due to the change of the composition of the gas fuel in as short a time as possible while preventing erroneous learning such that the operation state is not affected. For example, a regular travel state of a user, a travel time, and the number of times when the duration of "3" in FIG. 3 that satisfies the learning condition when performing such a travel occurs, are estimated. Then, the range in which the value of the fuel composition correction is limited is determined such that the gap of the air-fuel ratio correction coefficient due to an actually possible maximum change of the composition of the gas fuel can be made "1" within the estimated number of times. According to the setting in this way, for example, in a regular travel by the user, the impact due to the change of the composition of the gas fuel can be corrected.

Further, a control may be performed in which learning of the fuel composition correction is not performed in a state where the load and the rotation number of the engine is high but learning of the fuel composition correction is performed in a state where the load and the rotation number of the engine is low.

The above embodiment is described using an example in which the air-fuel ratio feedback control is performed by the 1st-ECU 11 and the fuel composition correction learning is performed by the 2nd-ECU 12; however, the fuel composition correction learning may be performed by the 1st-ECU 11. Further, the air-fuel ratio feedback control and the fuel composition correction learning may be performed by the 2nd-ECU 12. Further, the functions of the 1st-ECU 11 and the 2nd-ECU 12 may be integrated into one ECU. In this case, the functions of the CPU 11*e* and the CPU 12*d* may be integrated into one CPU, and the functions of the ROM 11*b* and the ROM 12*b* may be also integrated into one ROM.

Note that, each of the CPU 11*e* and the CPU 12*d* is an example of a correction device configured to calculate a correction coefficient of an air-fuel ratio feedback control during an operation with the second fuel and further correct a gap between the calculated correction coefficient and a targeted correction coefficient arising from the change of the composition of the second fuel. Further, the ROM 12*b* is an example of a storage device configured to store a fuel composition correction coefficient that is a value in a predetermined range.

Further, the CPU 12*d* is an example of a limiting device configured to set a limit to a changing range when the fuel composition correction coefficient is stored.

Hereinbefore, some embodiments of the present invention have been described; however, the embodiments are described just as examples and are not intended to limit the scope of the invention. The embodiments can be implemented in a variety of other configurations, and a variety of omissions, substitutions, and modifications can be made without departing from the scope of the invention. The embodiments and the modified embodiments are included in the scope of the invention and are similarly included in the scope of the invention described in the appended claims and the equivalent to the claimed invention.

What is claimed is:

1. An engine control system configured to selectively switch between a first fuel and a second fuel and perform an operation control of a single engine, the engine control system comprising:

a sensor configured to detect an oxygen concentration of an exhaust gas that is exhausted from the engine; and a control device configured to perform an air-fuel ratio feedback control using an air-fuel ratio correction coefficient such that an air-fuel ratio becomes a target air-fuel ratio based on an output signal of the sensor, wherein the second fuel is a gas fuel; and the control device comprises:

a correction device configured to calculate an air-fuel ratio correction coefficient of an air-fuel ratio feedback control during an operation with the second fuel and further correct, using a fuel composition correction coefficient, a difference between the calculated air-fuel ratio correction coefficient and a targeted air-fuel ratio correction coefficient arising from a change in composition of the second fuel;

a storage device configured to store the fuel composition correction coefficient that is a value in a predetermined range; and a limiting device configured to set a limit to a changing range when the fuel composition correction coefficient is stored.

2. The engine control system according to claim 1, wherein the control device calculates the fuel composition correction coefficient when the air-fuel ratio feedback control is in operation and while a purge control is stopped.

3. The engine control system according to claim 2, wherein an allowable value of the fuel composition correction coefficient is set in a range such that the change of the composition of the second fuel can be corrected while a predetermined operation state is continued for a predetermined duration.

4. The engine control system according to claim 3, wherein the control device does not store the fuel composition correction coefficient in a state where the load of the engine or the rotation number of the engine is high.

5. The engine control system according to claim 2, wherein the control device does not store the fuel composition correction coefficient in a state where the load of the engine or the rotation number of the engine is high.

6. The engine control system according to claim 1, wherein an allowable value of the fuel composition correction coefficient is set in a range such that the change of the composition of the second fuel can be corrected while a predetermined operation state is continued for a predetermined duration.

7. The engine control system according to claim 6, wherein the control device does not store the fuel composition correction coefficient in a state where the load of the engine or the rotation number of the engine is high.

8. The engine control system according to claim 1, wherein the control device does not store the fuel composition correction coefficient in a state where the load of the engine or the rotation number of the engine is high.

* * * * *